United States Patent [19]

Cassat et al.

[11] Patent Number: 5,245,256
[45] Date of Patent: Sep. 14, 1993

[54] CLOSED LOOP CONTROL OF A BRUSHLESS DC MOTOR AT NOMINAL SPEED

[75] Inventors: Alain M. Cassat, Pully; Laurent Cardoletti, Montreux, both of Switzerland

[73] Assignee: Seagate Technology, Inc., Scotts Valley, Calif.

[21] Appl. No.: 973,564

[22] Filed: Nov. 9, 1992

Related U.S. Application Data

[63] Continuation of Ser. No. 656,816, Feb. 15, 1991, abandoned.

[51] Int. Cl.$^5$ .............................................. H02K 23/00
[52] U.S. Cl. .................................... 318/254; 318/138; 318/439; 388/815; 388/928.1
[58] Field of Search ....................... 318/254, 138, 439; 188/809-815, 928.1

[56] References Cited

U.S. PATENT DOCUMENTS

| | | |
|---|---|---|
| 4,065,708 | 12/1977 | Ulland et al. |
| 4,513,230 | 4/1985 | Erdman et al. ........................ 318/254 |
| 4,641,066 | 2/1987 | Nagata et al. |
| 4,743,815 | 5/1988 | Gee et al. .............................. 318/254 |
| 4,862,045 | 8/1989 | Gleim et al. ......................... 318/254 |
| 4,922,169 | 5/1990 | Freeman .............................. 318/254 |
| 5,001,405 | 3/1991 | Cassat .................................. 318/254 |
| 5,028,852 | 7/1991 | Dunfield ............................. 318/254 |
| 5,117,165 | 5/1992 | Cassat et al. ........................ 318/254 |

Primary Examiner—William M. Shoop, Jr.
Assistant Examiner—David Martin
Attorney, Agent, or Firm—Flehr, Hohbach, Test, Albritton & Herbert

[57] ABSTRACT

A brushless DC motor control apparatus and method for regulating the speed of a motor at a nominal speed. The apparatus maintains a nominal motor speed without the use of conventional rotor position location devices such as Hall sensors. The current speed of the motor is determined using the back EMF zero-crossing measured only on complete rotor revolutions to mitigate motor dissymmetry errors. A control system compares the current speed to a desired speed and adjusts the total motor current to attain the desired speed. As a result, highly accurate speed control is maintained.

14 Claims, 13 Drawing Sheets

FIG.−1

| PARAMETERS | $V_{GG}$ | Syn | $V_G^{++}$ | $V_G^{-}$ | $V_G^{+}$ | $V_G^{-}$ |
|---|---|---|---|---|---|---|
| | 0 | 0 | 1 | 1 | 1 | 1 |
| | 0 | 0 | 1 | 1 | 1 | 0 |
| | 1 | 0 | 1 | 1 | 1 | 0 |
| | 1 | 1 | 1 | 1 | 1 | 0 |
| | 1 | 1 | 1 | 0 | 1 | 0 |
| | 1 | 0 | 1 | 0 | 1 | 0 |
| | 0 | 0 | 1 | 0 | 1 | 0 |
| | 0 | 0 | 1 | 0 | 0 | 0 |

FIG.—4

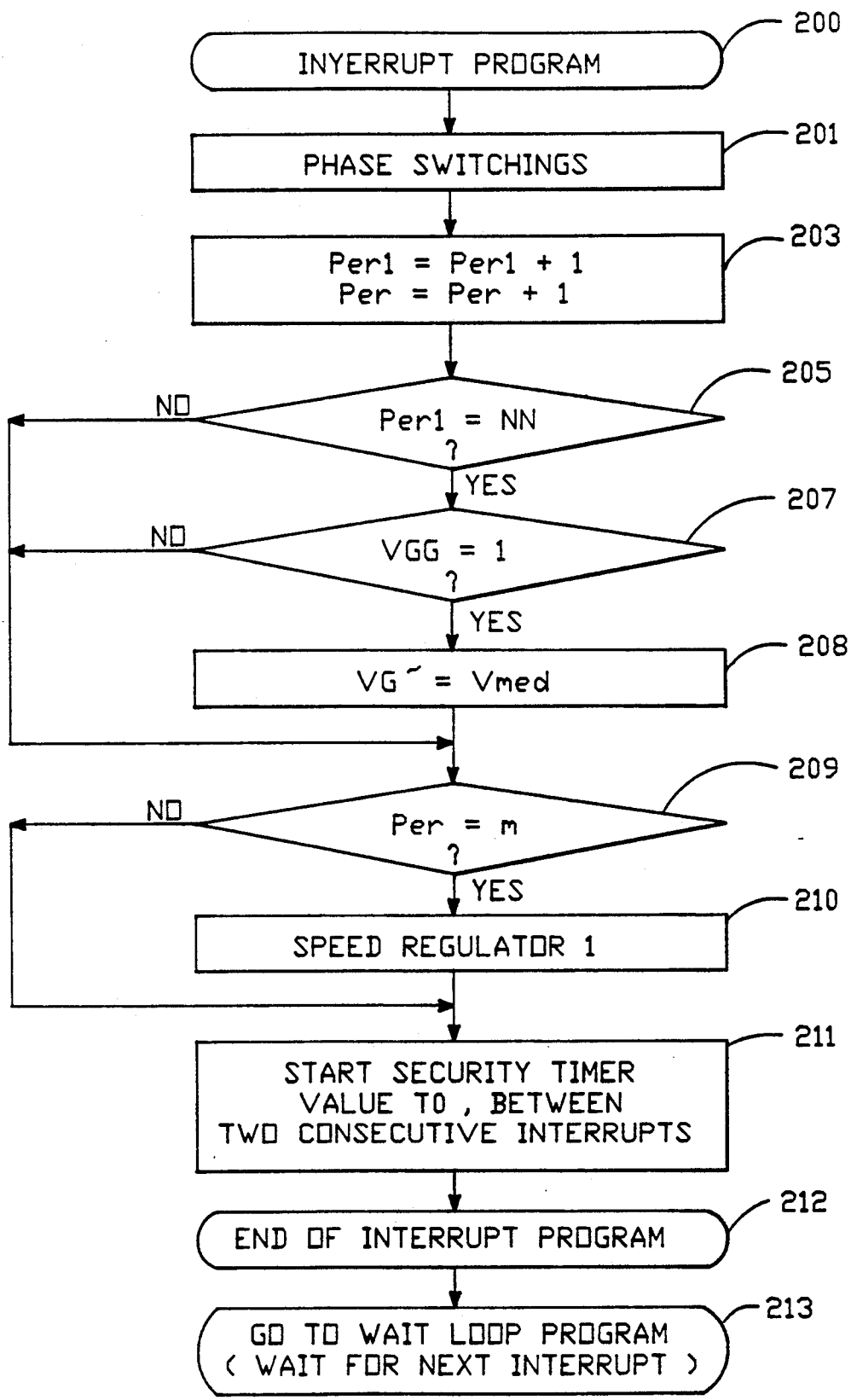
FIG.—7A

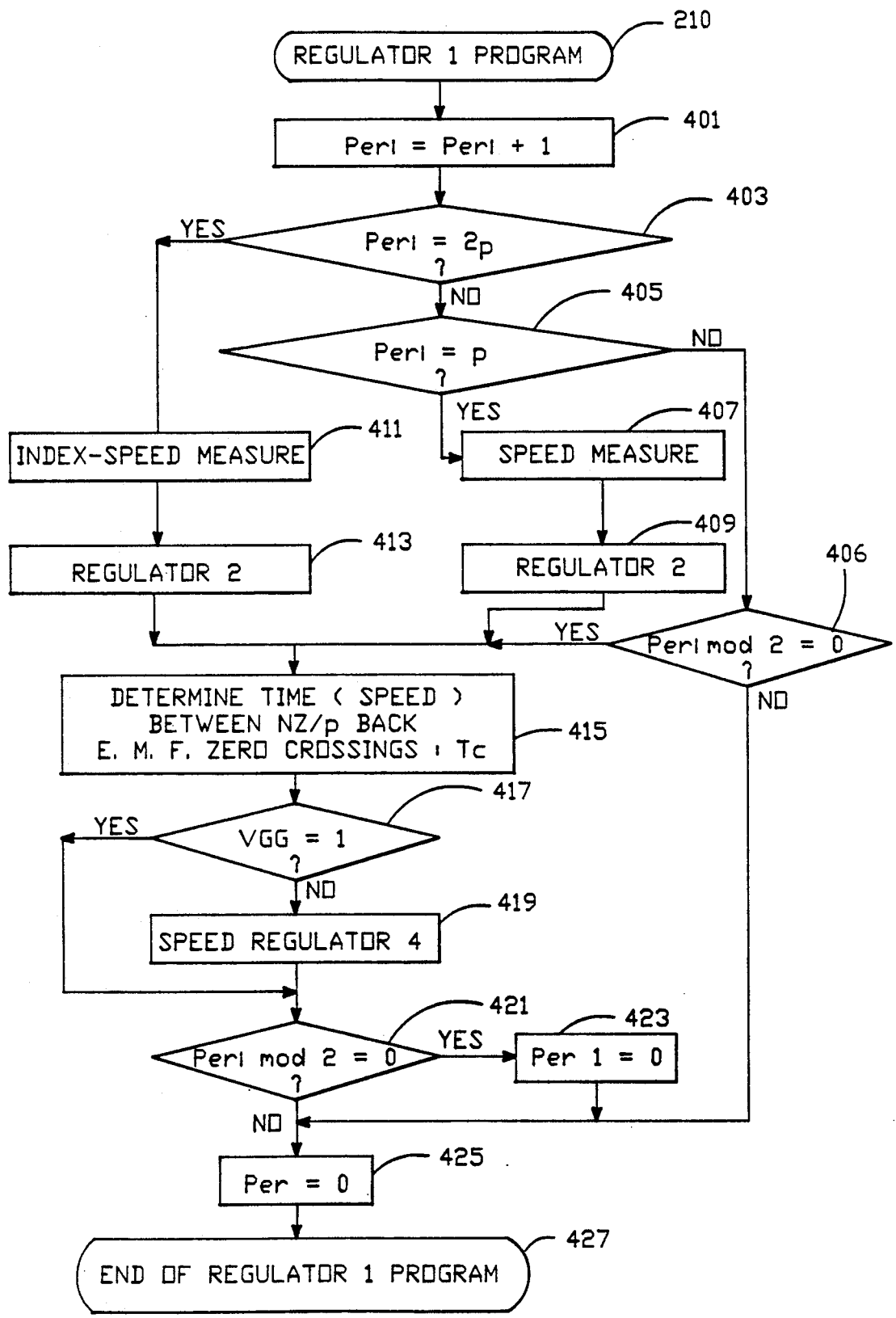
FIG.—7C

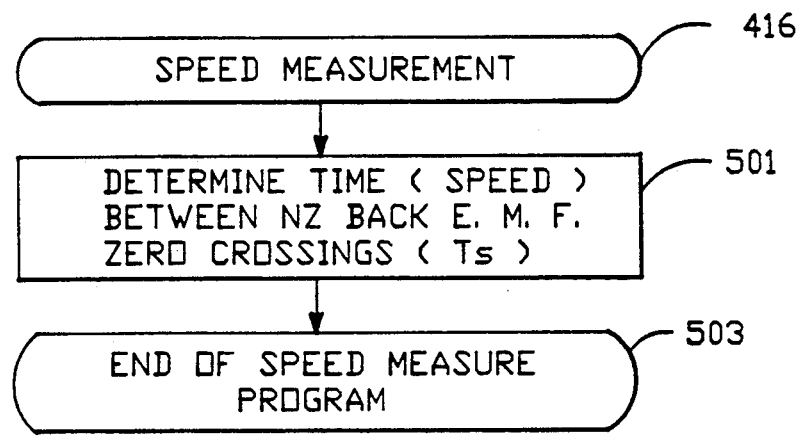
FIG.—7D

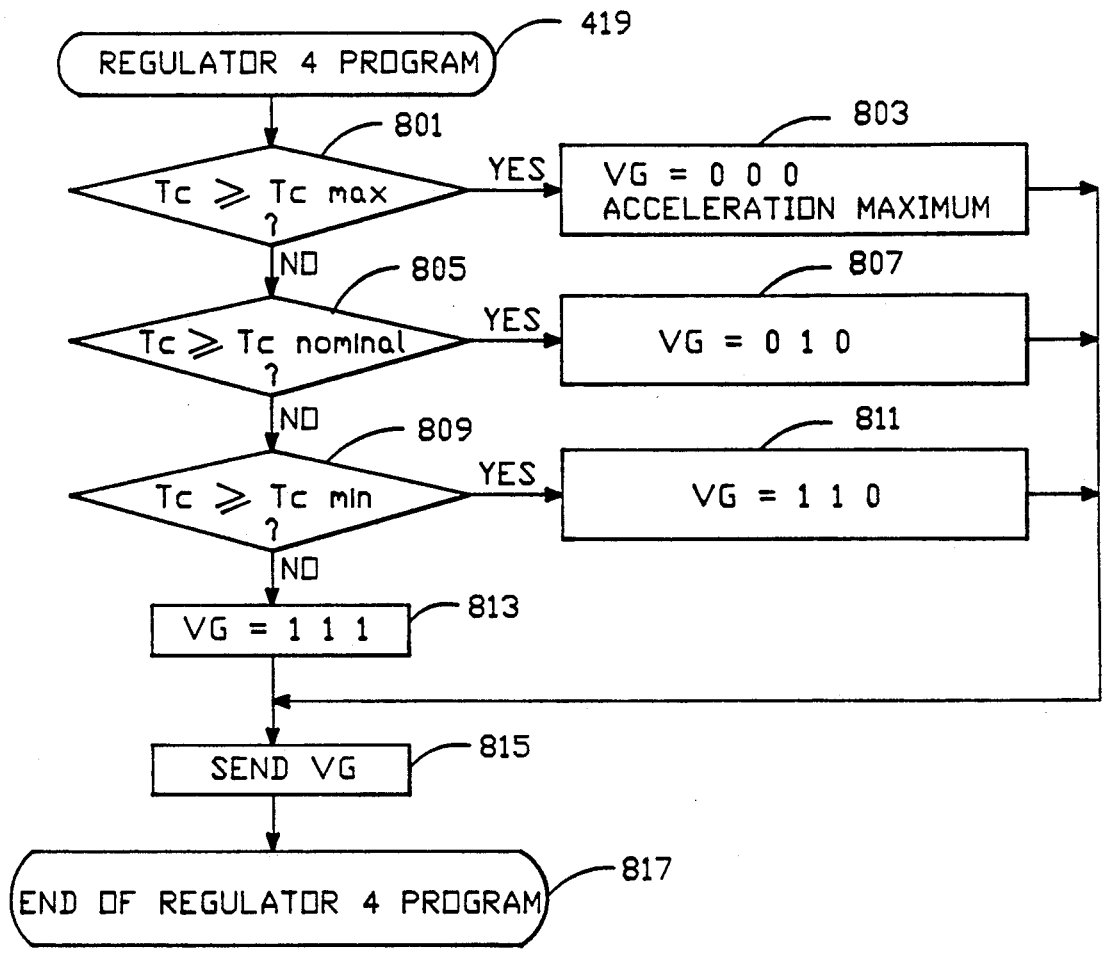
FIG.—7G
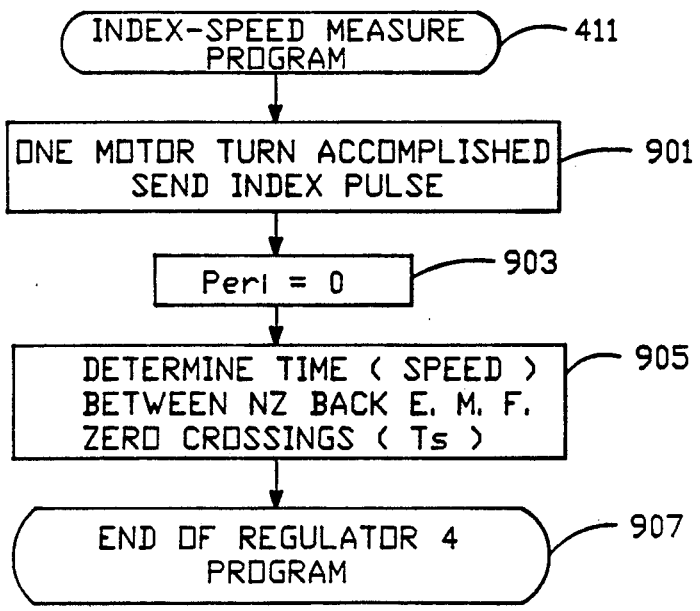
FIG—7H

CLOSED LOOP CONTROL OF A BRUSHLESS DC MOTOR AT NOMINAL SPEED

This is a continuation of application Ser. No. 07/656,816 filed Feb. 15, 1991 now abandoned.

The present invention relates generally to method and apparatus for controlling the speed of a brushless DC motor and particularly to methods and apparatus capable of driving a brushless dc motor at a constant nominal speed with a high accuracy, without the use of known rotor position detecting elements such as Hall elements. The method presented applies to any type of motor having an excitation flux created by a permanent magnet or by DC current excitation of a winding.

BACKGROUND OF THE INVENTION

Briefly stated, a brushless DC motor is a motor in which the position of the magnetic poles of a rotor are detected by means of a detector directly coupled to the shaft of the rotor. In response to the detected position, semiconductor switching elements such as transistors, thyristors, or the like are activated so as to continuously generate torque in the motor. Either field windings of a multi-segment permanent magnet is used for the rotor.

The torque is created by application of currents to the stator or field windings in sequential order. Subsequently, each winding current radiates a torque-inducing magnetic flux that moves the rotor. The DC currents are alternately switched about the field to create various current paths that produce magnetic flux orientations in a synchronized fashion. The synchronous magnetic flux results in a torque on the rotor that causes the desired rotational movement. In order to ensure that current is applied to the proper motor phase, sensing devices are used to provide information concerning the position of the rotor. Typically, position information is determined by employing Hall sensors, optical sensors, or resolvers. These sensor systems determine the relative position of the rotor within one electrical cycle. They cannot provide an absolute position. However, the relative position is accurate enough to enable the motor to be started in the correct direction and accelerated to a nominal speed.

Of the various sensor systems available, the best known and most commonly used, especially in motors where economy and small size are of significant importance, are Hall sensors. However, in use, the position of the Hall elements must be very precisely fixed. Further, the heat sensitizing temperature of a Hall element is limited causing deterioration of the motor characteristics under heavy loading. Additionally, Hall devices are notorious for having short life expectancies. Consequently, using Hall devices significantly limits the reliability of a motor. Also, incorporating Hall sensors into a motor inherently increases the size, manufacturing cost, complexity, and power consumption of the motor.

A number of solutions have been developed in an attempt to avoid using sensors. For example, methods disclosed to date include direct or indirect back electromagnetic force or EMF detection as disclosed in V. D. Hair, "Direct Detection of Back EMF in Permanent Magnet Step Motors", Incremental Motion Control Systems and Devices, Symposium, Urban-Champaign, 1983, pp. 219-21 and K. M. King, "Stepping Motor Control", U.S. Pat. No. 4,136,308, January 1979. Other applicable disclosures include a current analysis in B. C. Kuo, A. Cassat, "On Current Detection in Variable Reluctance Step Motors", Incremental Motion Control Systems and Devices, 6th Annual Symposium, Urban-Champaign, 1977, pp. 205-220 and two third harmonic analyses disclosed in P. Ferrario, A. Vagati, F. Villata, "PM Brushless Motor: Self Commutating Prerogatives with Magnetically Anisotropic Rotor", Instituto di Elettriche, Politecnico di Torino, Italia, and R. Osseni, "Modelisation et Auto-commutation des Moteurs Synchrones", EPFL No. 767, 1989. A rotor position location system using short current pulses has been disclosed in "Detection of Rotor Position in Stepping and Switched Motors by Monitoring of Current Waveforms" by P. P. Acarnley et al., printed in Transactions on Industrial Electronics, August 1985.

However, these methods have two major disadvantages: first, they do not provide any information concerning the position of the rotor at standstill; and second, the back EMF, in most instances, is undetectable at low to medium motor speeds. Consequently, the back EMF methods are not a feasible solution to providing motor control at start-up or initial acceleration.

Various methods and apparatuses to determine the position of a rotor at both standstill and slow speed have been disclosed in "Position Detection for a Brushless DC Motor", U.S. Pat. No. 5,001,405; "Closed-Loop Control of a Brushless DC Motor from Standstill to Medium Speed", U.S. Pat. No. 5,117,165; and "Position Detection for a Brushless DC Motor Without Hall Effect Devices Using a Time Differential Method", U.S. Pat. No. 4,028,852. In aggregate, the above-listed inventions determine the rotor's position at standstill and at low speed while the motor is accelerating to a medium speed. At medium speed, a large back EMF is available to enable the traditional back EMF control circuits to function adequately. The motor is then accelerated under the back EMF control system until a nominal speed is attained.

One known effort to control the motor speed at its nominal speed with a high accuracy is disclosed in U.S. Pat. No. 4,876,491. The method described is only applicable when the motor is used in a hard disc drive. In the main, the motor speed is regulated by a number of concentric tracks of information which are written onto the disc drive media. The speed controller reads this stored information and determines the time between two consecutive tracks of information. This measured time is compared to a reference time associated with the desired nominal speed. Depending on the difference between the reference and the measured time, the controller will accelerate or decelerate the motor in an attempt to match the measured time with the reference. This approach has two major disadvantages: first, the motor control system must use an outside source of information, i.e. the stored information on the disc drive; and second, the time between two consecutive track information measurements may fluctuate depending on motor dissymmetry.

SUMMARY OF THE INVENTION

In summary, the present invention is a highly accurate control system for accelerating a brushless DC motor from medium speed to nominal speed and then maintaining a constant nominal speed.

Once the motor has reached a medium speed, the preferred embodiment of the invention detects the position of the rotor using the zero-crossings of the measured back EMF. The position can be determined with a resolution of $\pi/m$, where m is the number of motor phases.

In keeping with one aspect of the invention, the apparatus uses the zero-crossings of the detected back EMF in conjunction with an indexing method to accurately determine the motor speed irrespective of motor characteristic variations due to temperature or motor dissymmetry. Additionally, the sequential phase switching necessary for brushless motor operation is controlled by the zero-crossing detection and indexing system.

In accordance with another aspect of the invention, control of the motor's speed is accomplished by regulating the total current delivered to the motor based upon the measured speed. To achieve accurate motor control, a variable shunt is connected in series with the motor driver. The shunt is controlled by a variable gain integrator whose gain is proportional to the speed measurement.

BRIEF DESCRIPTION OF THE DRAWINGS

Additional objects and features of the invention will be more readily apparent from the following detailed description and appended claims when taken in conjunction with the drawings in which:

FIG. 4 shows the speed control parameters which are implemented at various measured speeds;

FIGS. 7A to 7H are detailed flow chart of the method of regulating brushless DC motor speed as disclosed in the present invention.

DETAILED DESCRIPTION OF A PREFERRED EMBODIMENT

Any polarized motor, such as a brushless DC motor including either permanent magnets or excitation windings, will produce a back EMF in the motor phases while operating. Consequently, at high speeds the back EMF can be detected in order to determine the rotor position. This method is well known in the art.

The back EMF fluctuates as a sine function. Each zero-crossing of the detected back EMF is associated with a rotor position. However, this single measurement is ambiguous as to the orientation of the rotor. Therefore, one other parameter must be known to provide a position resolution of $\pi/m$ radians. The parameter used is the excitation current.

To operate a brushless motor, the current to the phases is switched synchronously at a specified lead angle ahead of the current rotor position. For example, in a three phase motor, two of the phases are energized while one is not. The back EMF signal is monitored on the unenergized phase to determine the back EMF zero crossings. Combining the zero-crossing information with the knowledge of which phases are excited, the rotor position can be determined with a resolution of $\pi/m$ radians.

Figure 1:
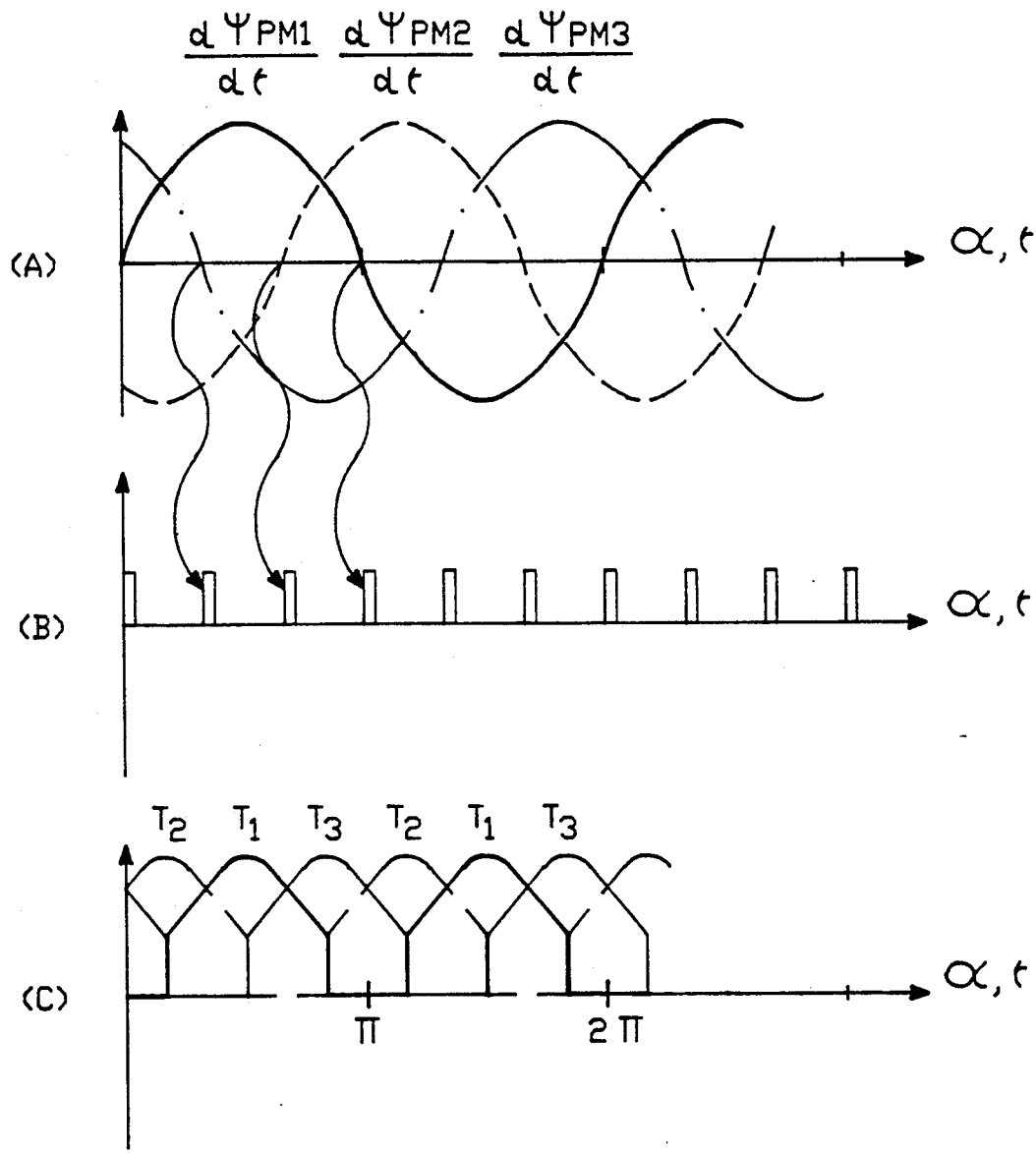
FIGS. 1A to 1C depict the temporal relationship between the phase back EMF signals, the back EMF zero-crossing signals, and the phase torques.

The preferred embodiment creates a pulse at each back EMF zero-crossing. FIG. 1 depicts the relationship between the (A) phase back EMF, the (B) zero-crossing pulses, and the (C) phase torques. The phase voltages and phase torques are calculated by the following equations:

$$U_k = R_k \cdot i_k + \sum_{j=1}^{m} L_{kj} \cdot \frac{di}{dt} j + \frac{d\Psi}{dt} PMk \quad [1]$$
$$k = 1, 2, \ldots, m$$
$$j = 1, 2, \ldots, m$$

$$T_k = d\frac{\Psi}{dt} PMk \cdot \frac{dt}{d\alpha} \cdot i_k \quad [2]$$
$$k = 1, 2, \ldots, m$$

Where:
$U_k$ = phase voltage k
$i_k$ = phase current k
$R_k$ = phase resistance k
$L_{kj}$ = mutual inductance between phase k and phase j
$\Psi_{PMk}$ = flux due to permanent magnet in phase k
$T_k$ = mutual torque of phase k and permanent magnet
$\alpha$ = rotor position $$\frac{d\Psi}{dt} PMk$$

= phase k back EMF
m = total number of motor phases

Equation 1 shows that the phase voltage is equal to the phase back EMF when the phase current and the current derivative are equal to zero. However, during the time that the kth phase current is zero, other phase currents are flowing. These other currents tend to cause a voltage to appear at the kth phase in addition to the back EMF term due to mutual inductances between the phases. However, in a three-phase, star configuration motor, while the kth phase current is zero, the other two phase currents flow in equal, but opposite, directions through their respective phases. Consequently, the voltage in the kth phase due to the mutual inductance from the other two phases is substantially zero.

When the motor is operated with a 120 electrical degree on duration, as depicted in FIG. 1C, the zero crossing for the back EMF of a given phase occurs during the period in which no current is applied to that phase. Since the mutual inductance terms are additively zero, the back EMF term of Equation 1, is easily detected. The zero crossings are converted into a pulse sequence as shown in FIG 1B.

The speed of the motor could easily be determined by measuring the time duration between two consecutive zero-crossing pulses. However, experience dictates that the occurrence of a zero-crossing is dependent upon motor parameters, and consequently, will vary significantly with motor dissymmetries. The preferred embodiment circumvents these motor irregularities by utilizing the geometric and magnetic periodicity of the motor.

The number of zero crossings per geometrical turn of the rotor is determined by the following equation:

$$NZ = 2 \cdot m \cdot p \quad [3]$$

Figure 2:
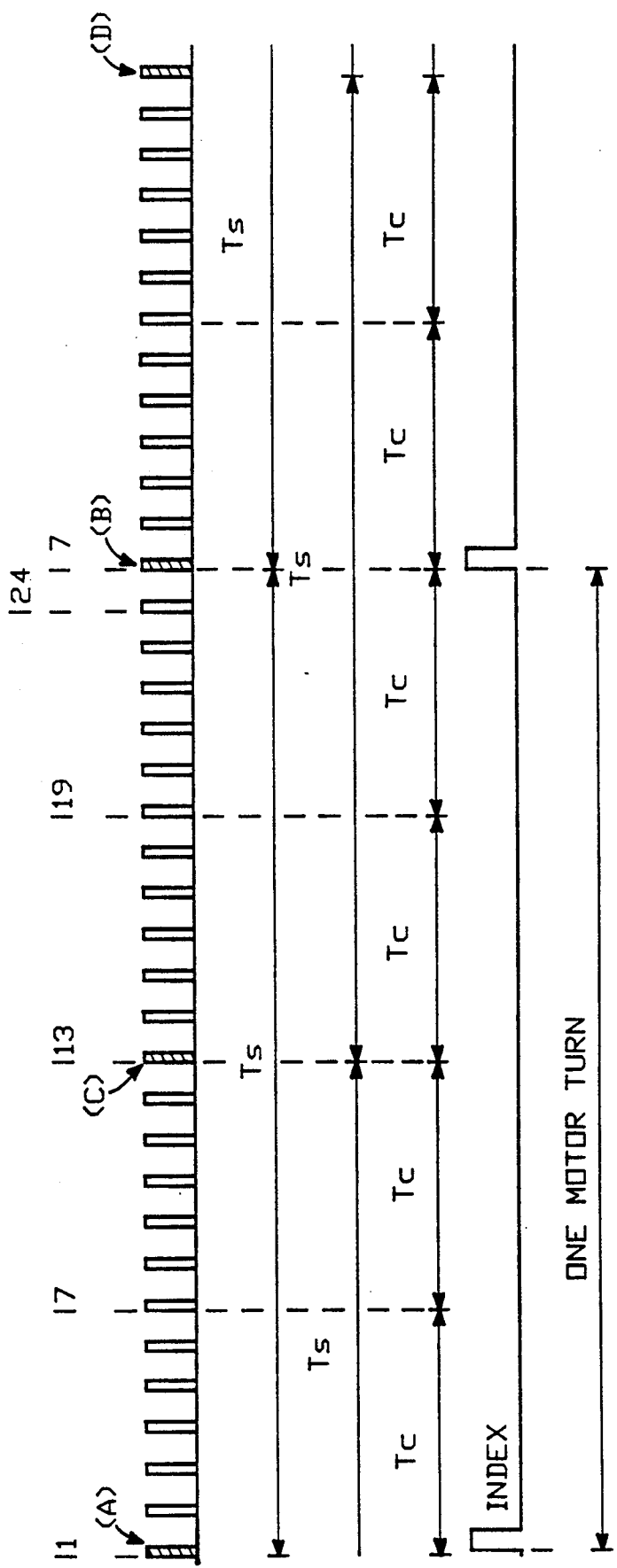
FIG. 2 illustrates a pulse sequence resulting from detecting back EMF zero-crossings in an eight-pole, three-phase motor.

Where:
NZ = total number of zero crossings per revolution
m = number of motor phases
p = number of pairs of permanent magnet poles For example, a three-phase, eight-pole motor would have twenty-four back EMF zero crossings occur for each pole during one rotor revolution. FIG. 2 depicts the pulse sequence resulting from detecting the back EMF zero crossings for the example. Point A is an arbitrarily chosen zero crossing to be used as a reference point. Point B occurs exactly one rotor revolution later. The alignment of the phases and rotor are identical for points A and B. Thus, a speed measurement determined using these two points avoids dissymmetry errors. The speed is derived by dividing the distance traveled, in this case one revolution, by the elapsed time $T_s$. However, experience has shown that a single speed measurement per revolution does not assure reliable speed control. To enhance the motor control, a second speed determination is effectuated using back EMF zero crossings at one revolution intervals interleaved with the first set of measuring points A, B. The interleaved points are shown as C and D of FIG. 2. Again, the speed is determined using position information that is exactly one revolution distant; thus, the motor dissymmetries are attenuated.

A final speed measurement is conducted at each half pole turn by measuring the duration $T_c$ between back EMF pulses which occur each half pole turn. Referring to FIG. 2, the half turn duration is measured from pulse A to C, and C to B, and so on. However, motor dissymmetries appear in these measurements. Therefore, they are only utilized to determine motor speed during times of extreme acceleration or deceleration.

In total, three speed measurements are conducted, two full geometric turn measurements and one electrical period measurement. These form the basis for accomplishing very accurate speed control.

Figure 3:
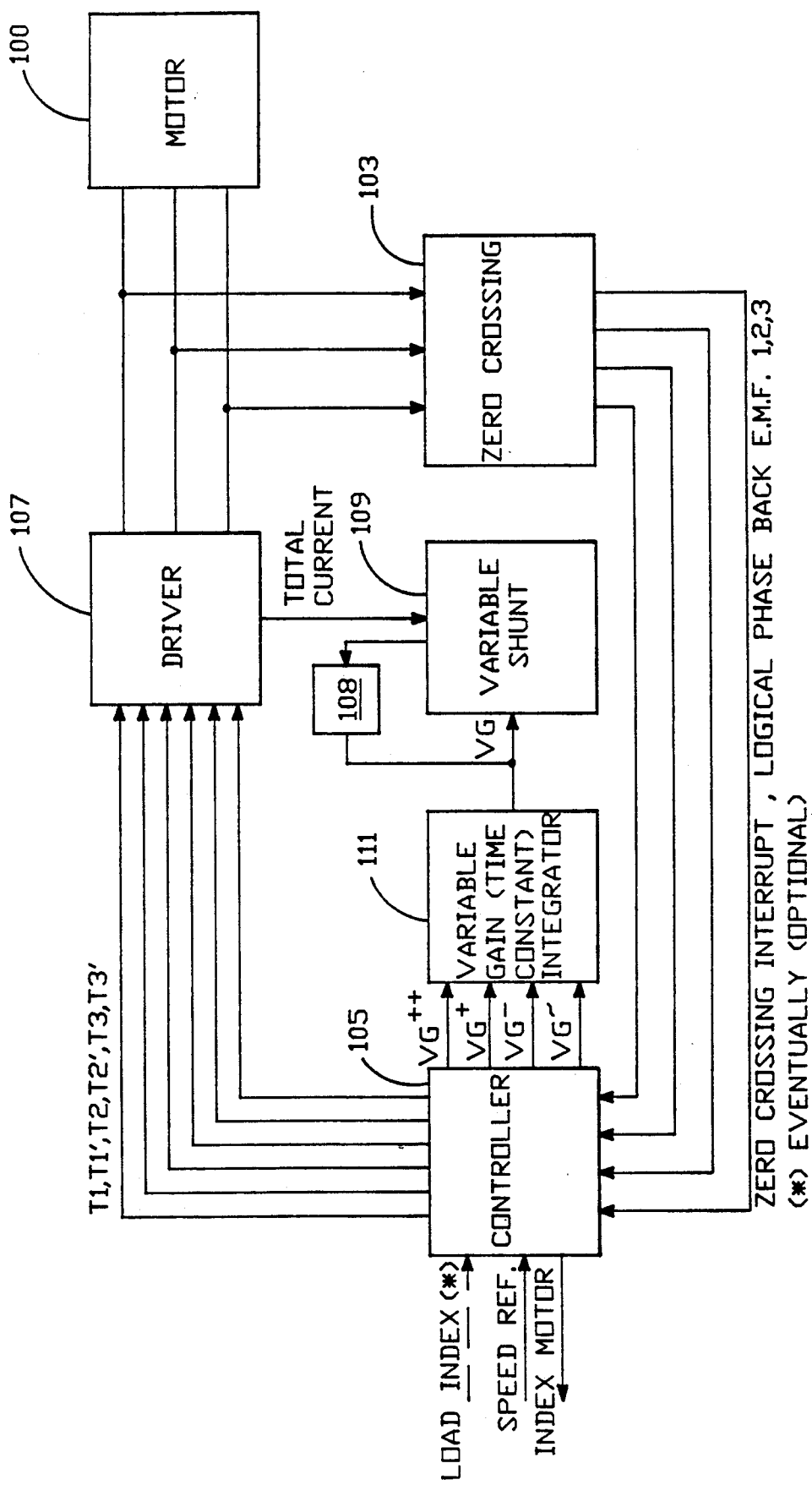
FIG. 3 is a block diagram of the total control system.

FIG. 3 is a block diagram representation of a preferred embodiment of the present invention. The objective of the system is to accurately control the speed of motor 100. Referring to FIG. 3, the back EMF on each phase is sampled to detect the zero crossings during the time that the phase is not energized. The back EMF zero crossing detector 103 produces the pulse sequence representing the zero crossings as well as a 3-bit digital representation of the rotor's current position based upon which phases are currently energized and which are currently sampling the back EMF.

Controller circuitry 105 accomplishes two procedures. First, it determines which phases will be energized next to maintain rotor motion. The decision is based upon the current rotor position information supplied by the back EMF zero crossing detector 103. The phase combination of choice is sent to the motor driver circuit 107 via lines $T_1$, $T_1'$, $T_2$, $T_2'$, $T_3$, $T_3'$. The driver 107 provides the properly-oriented currents to the phases of motor 100 to maintain the rotor motion.

The second function of the controller 105 is to monitor and control the motor's speed. As discussed previously, the number of pulses representing the back EMF zero crossings per single revolution of the rotor is constant. In the 8-pole, 3-phase example, that fixed number is 24, when measured for every full turn. Additionally, the controller 105 produces an index pulse corresponding to each rotor revolution. A LOAD INDEX port is optionally provided to enable the controller and motor to be synchronized to the INDEX signal of a second motor.

In order to determine the rotor speed in the three-phase, eight-pole example, the controller 105 must determine the time elapsed between each twenty-fourth pulse. This represents the elapsed time per revolution, $T_s$ in FIG. 2. The time measurement is compared to a speed reference time that represents the nominal speed of the motor $T_{snom}$. The difference between the measured duration between pulses $T_s$ and the reference $T_{snom}$ is the basis upon which the motor's speed is increased or decreased. A second full turn measurement is conducted starting one half turn from the first measure $T_s$. The measurement is accomplished in the same manner as the first speed measurement, via measuring the elapsed time between each twenty-fourth pulse. A third speed measurement time $T_c$ is conducted each two geometrical pole turns, which correspond to the time between each 2·m pulse (in our example: 2m=6). This time $T_c$ is compared to a speed reference time that represents the nominal speed time $T_{cnom}$, for two geometrical pole turns. Each of these three speed measurements is interpreted by the controller 105 and a proper speed adjustment is determined.

The controller 105 maintains a plurality of boundaries forming windows to which the determined speeds $T_s$ and $T_c$ are compared, as shown in FIG. 4. Where a speed measurement falls in the set of windows determines a variable set that regulates the motor speed. The parameters $V_G{++}$, $V_G{+}$, $V_G{-}$, and $V_G{-}$ control the acceleration and deceleration of the motor, while $V_{GG}$ is a flag designating that the current speed is within the outer windows or course control windows and SYN is a flag designating that the current speed is within the inner windows or fine control windows. The following table summarizes the parameters in FIG. 4.

| | | |
|---|---|---|
| $V_{GG}$, SYN | 0, 0 | motor operating outside $S_{nom} \pm \Delta S1$ |
| | 1, 0 | motor operating in the "course" control range |
| | 1, 1 | motor operating in the "fine" control range |
| $V_G{++}$ | 0 | acceleration maximum |
| | 1 | inactive |
| $V_G{+}$ | 0 | acceleration |
| | 1 | inactive |
| $V_G{-}$ | 0 | acceleration |
| | $V_{med}$ | inactive |
| | 1 | deceleration |
| $V_G{-}$ | 0 | inactive |
| | 1 | deceleration |

Where a state function of 1 corresponds to a physical voltage of $V_{DD}$ and a 0 corresponds to a physical voltage of zero. Determination of the value of $V_{med}$ is described At start-up, the controller 105 output initially only has $V_G{++}$ active. This corresponds to having maximum acceleration. However, as soon as enough interrupt pulses have been accumulated to produce a motor speed estimate, the controller 105 begins actively controlling the motor 100 using $V_G{+}$, $V_G{-}$, and $V_G{-}$. the motor 100 is accelerating, it will inherently have an initial speed measurement positioned on FIG. 4 that is outside the $S_{nom} - \Delta S_3$ window. Consequently, the controller 105 applies the $V_G{+}$ and $V_G{-}$ signals to the variable gain integrator 111 to maintain the acceleration.

Inside the speed $\geq S_{nom} \pm \Delta S_3$ window, the $V_G{+}$ signal is inactive and control is manifested solely by the $V_G{-}$ signal. The $V_G{-}$ signal, as a dual polarity signal, controls both acceleration and deceleration around the $S_{nom} \pm \Delta S_3$ window, the $V_G{-}$ signal is applied to quickly reduce the speed. Additionally, if the controller 105 determines that the speed is proper and a change is not in order, $V_G{-}$ is set to $V_{med}$.

Figure 5:
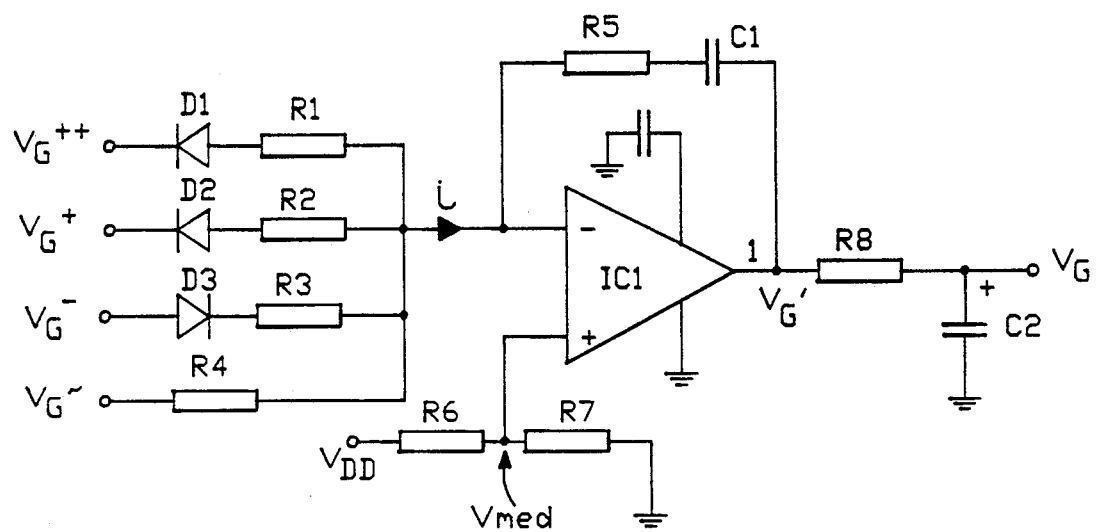
FIG. 5 schematically represents the variable gain integrator circuit.

Each of the aforementioned control signals determine the gain of the variable gain integrator 111 depicted in FIG. 5. The integrating function of the circuit is determined by the operational amplifier IC1 operating in conjunction with the feedback elements R5 and C1, typically 470k ohms and 1 micro-farad, respectively. R8 is the load resistor, typically 2.7k ohms, and C2 is a filter capacitor, typically 1 micro-farad. The voltage divider, R6 and R7, sets the positive terminal voltage at a nominal value $V_{med}$. As an example, R6 and R7 are each 10k ohms, thus the value of $V_{med}$ is half of $V_{DD}$.

The output voltage of the integrator is proportional to the integrated current produced by the difference voltage between the word $V_G$ ($V_G^{++}$, $V_G^+$, $V_G^-$, $V_G^-$) voltage and the value $V_{med}$ at the minus terminal of IC1 (V minus=V plus of IC1). The proportion is a gain function defined by the resistors R1 through R5, typically 470, 1M, 47K, 10M, and 470K, respectively. For example, when $V_G^{++}$ is a logical O, $V_G^-$ is a logical 0 and $V_G^+$ is a logical 1. $V_G^-$ is biased to equal the set nominal value $V_{med}$. Biased in this way, diodes D2 and D3 ensure that $V_G^+$ and $V_G^-$ will have no effect on the circuit's operation. However, diode D1 is forward biased and allows current to flow through the $V_G^{++}$ arm in equal to R5/R1. The other biasing options determine other gains. The table below summarizes the simple cases, in reality the biases can be mixed resulting in more gain combinations than are shown.

| $V_G^{++}$ | $V_G^+$ | $V_G^-$ | $V_G^-$ | GAIN |
|---|---|---|---|---|
| 0 | $V_{DD}$ | 0 | $V_{med}$ | R5/R1 |
| $V_{DD}$ | 0 | 0 | $V_{med}$ | R5/R2 |
| $V_{DD}$ | $V_{DD}$ | $V_{DD}$ | $V_{med}$ | R5/R3 |
| $V_{DD}$ | $V_{DD}$ | 0 | $V_{med}$ | $V_G$ is constant |
| $V_{DD}$ | $V_{DD}$ | 0 | 0 | R5/R4 |
| $V_{DD}$ | $V_{DD}$ | 0 | $V_{DD}$ | R5/R4 |

The value of $V_G$, in FIG. 4, the integrating amplifier's output, varies as the differential voltage at the input terminals of IC1 changes. Thus, the output of IC1 is regulated by the controller via the input parameters: $V_G^{++}$, $V_G^+$, $V_G^-$, and $V_G^-$.

Figure 6:
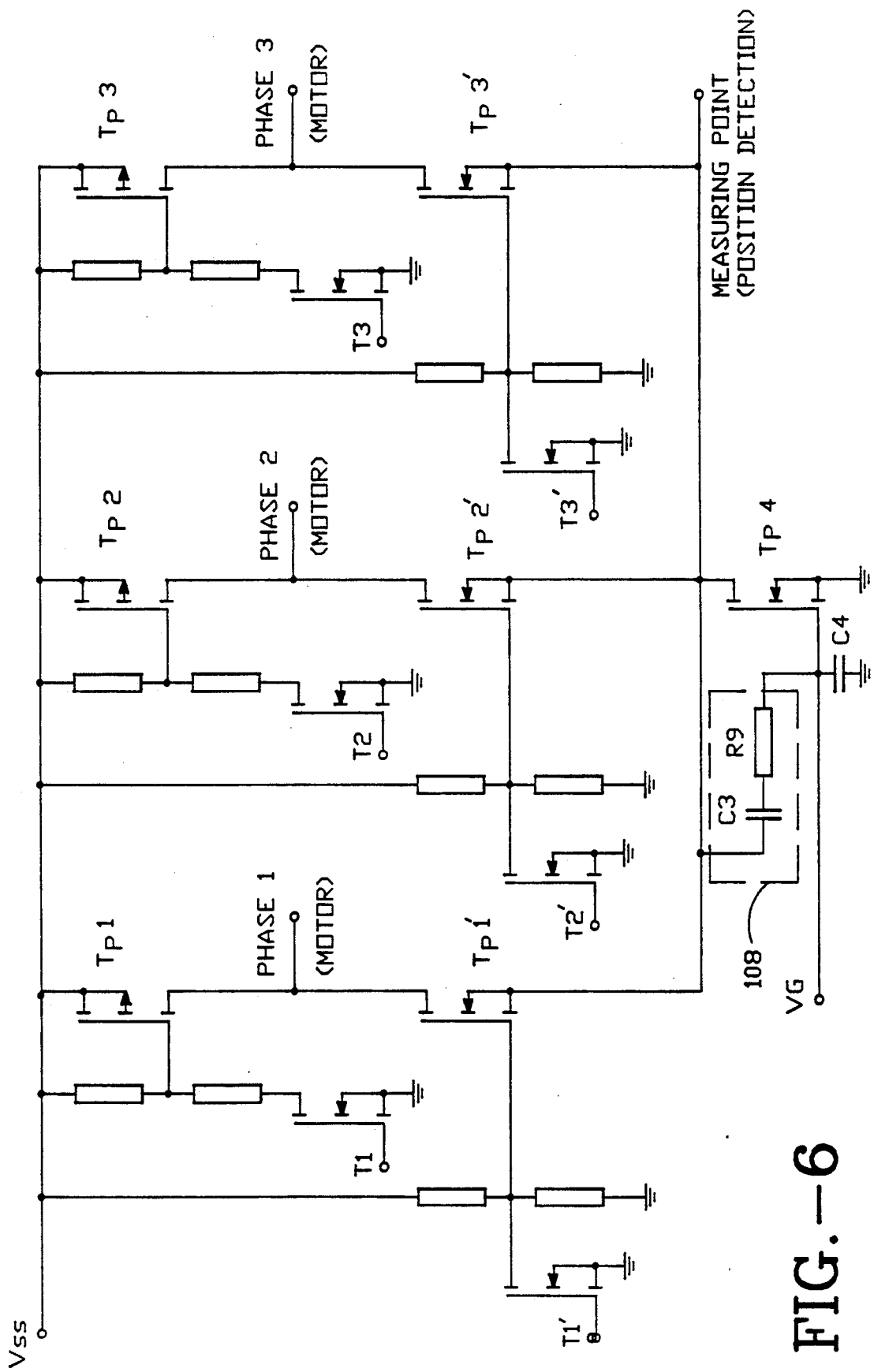
FIG. 6 schematically represents a driver circuit with an integral variable shunt current regulation circuit.

Regulation of the motor's total current is used to control the motor's speed and is implemented using the variable shunt 109. An exemplary driver and shunt circuit appears in FIG. 6. The phase commutation control signals, $T_1$ through $T_3$, and $T_1'$ through $T_3'$, switch each phase "on" and "off" at the appropriate time. Total motor current available during the "on" periods is regulated by transistor $T_{p4}$ which is controlled via signal $V_G$. The current flowing through the phases is directly proportional to the acceleration attainable. Thus, $V_G$ controls the speed of the motor.

The resistor-capacitor combination, C3 and R9, forms a negative feedback circuit 108 to stabilize the control circuit and ensure that divergence does not occur. In other words, the feedback circuit limits the applied current variation.

The intricate process by which the speed is controlled is described most simply by flow chart, as shown in FIGS. 7A to 7H.

As described in the background section, the motor is started and accelerated to a nominal speed using any of the methods shown in the art. At a nominal speed, the magnitude of the phase back EMF is large enough to use to control the speed of the motor in a non-intrusive manner. At the point where the back EMF signal has attained a significant signal strength, the back EMF zero crossing detector 103 creates a pulse sequence synchronous with the zero crossings. The pulse created at each zero crossing is called an interrupt pulse. The first of these initiates the interrupt program 200 in FIG. 7A.

Figure 7B:
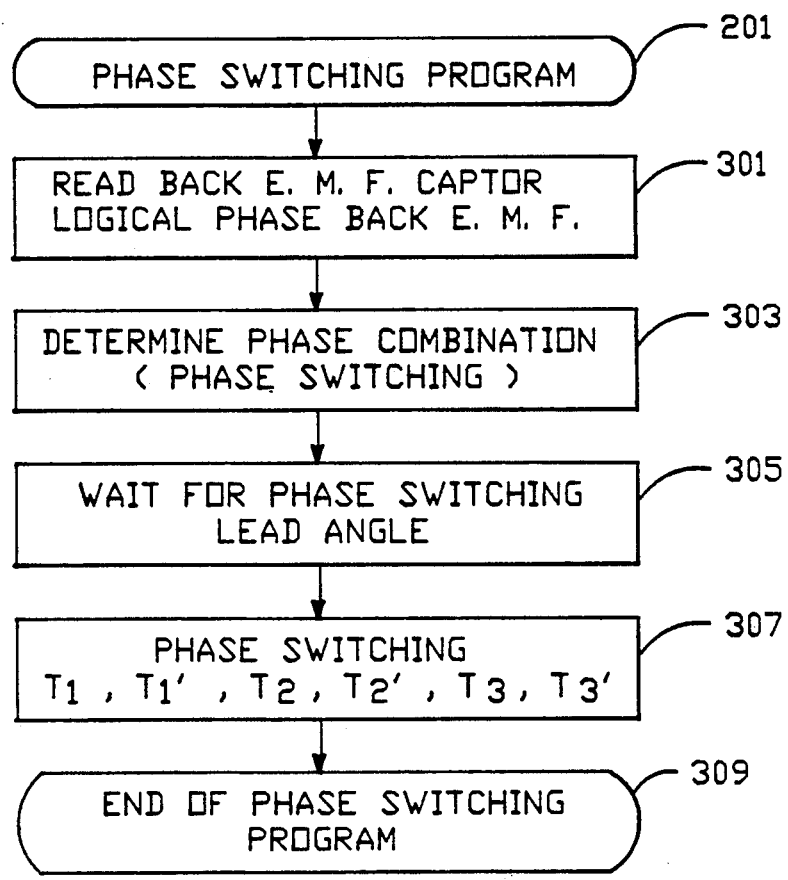

The first step of the interrupt program is to begin the phase switching algorithm 201 and maintain the motor 100 motion. FIG. 7B shows a representative flow chart of the mechanics associated with phase switching. The current rotor position is determined using one of the many prior art back EMF detection methods in step 301. From the known rotor position, the next phase combination to be energized is determined in step 303 using a simple look-up table. In step 305, the program waits until the proper lead angle between the rotor position, i.e., the interrupt pulse, and the applied current is attained. For the three phase example, a lead angle of 30 electrical degrees is desired. At the appropriate time, the phase switching occurs, represented by step 307, and the next combination of phases are energized. At this point 309, the phase switching program ends and the algorithm continues within the interrupt program at step 203.

At step 203, the counters PER and PER1 are incremented by 1. During the first loop, the previous value of each counter is 0. At step 205, the current PER1 count is compared to a variable representing the number of interrupt pulses that must pass before a speed correction is finished. This number is representative of the correction duration and is determined in a later step (REGULATOR 3 subroutine). During the first pass through the algorithm, PER1 will not be equal to NN. For example, at start-up, $NN_{min}$ is initialized to 2. The initial value of NN is defined by the motor application.

At step 209, the current value of counter PER is compared to the total number of phases m. In the example, the motor is three-phase; thus, m=3 and PER is not equal to three at this time. The security timer is started a step 211 during the first pass through the algorithm. The timer is restarted at each zero-crossing interrupt pulse. If a pulse does not occur within a designated time period, the algorithm and the motor are restarted.

The algorithm is halted at step 212 and waits at step 213 until the next zero crossing pulse. The next pulse begins the algorithm again at step 200. The phases are commutated as per step 201 and the counters, PER and PER1, are both incremented by 1 at step 203. On this pass, the answer to the step 205 query is yes, causing the algorithm to initiate step 207 to determine whether the motor is within the fine or course adjustment range. Since the motor has just begun, it is assumed that the fine/course designator flag will indicate that the motor needs course tuning $V_{GG}=0$. Course tuning is the start-up state of the control system. At step 209, the motor has not fully commutated all of the phases; therefore, the answer to the step 209 query remains no. The algorithm continues with the previously explained steps: 211, 212, 213.

On the third pass through the algorithm, the query at step 209 will be answered affirmatively for a three-phase motor. The REGULATOR 1 subroutine will be initiated at step 210, see FIG. 7C. The initial step, step 401, in this subroutine increments a counter, PER1, by one. Step 403 queries whether the PER1 counter has attained the value of 2 times p, where p is the number of pairs of rotor poles. In the present example, p equals 4. Thus, when PER1=8, the motor has completed one revolution. On this initial pass through the subroutine, the answer to the query of step 403 is negative. At step 405, the question presented is whether PER1 equals p. Again, since this is the initial pass the answer is no. When PER1=p, the motor has completed one half turn.

The routine then proceeds to step 406, where the query is whether the modulo(2) of the current PER1 counter value equals zero. This query determines whether PER1 is an even number. The answer is no. The subroutine resets the counter PER to zero at step 425 and then returns to the main program at step 211. If the answer to the step 406 query were yes, the process would invoke the steps to measure motor speed based on one electrical period (two pole). This is accomplished by steps 415 to 419 as described below. Continuing the main program must increment PER to m=3 before returning to the REGULATOR 1 subroutine. In other words, three more interrupt pulses must occur.

The aforementioned process is repeated until PER1 is incremented at step 401 to a value of 4, which equals p for the present example. Thus, the answer to the step 403 query is again no, but the step 405 answer is affirmative. This indicates that the motor has completed one-half of a geometrical revolution from the arbitrary reference originally chosen. The speed of the motor is measured by timing the duration required for the motor to complete a single revolution from a point one-half of a revolution prior to the arbitrary starting point to the current position one half of a revolution past the reference point. The duration to complete a revolution is $T_s$ and it is measured in steps 407, 501, and 503 of FIG. 7D. The speed measurement subroutine returns to the REGULATOR 1 program to initiate the REGULATOR 2 program at step 409.

Figure 7E:
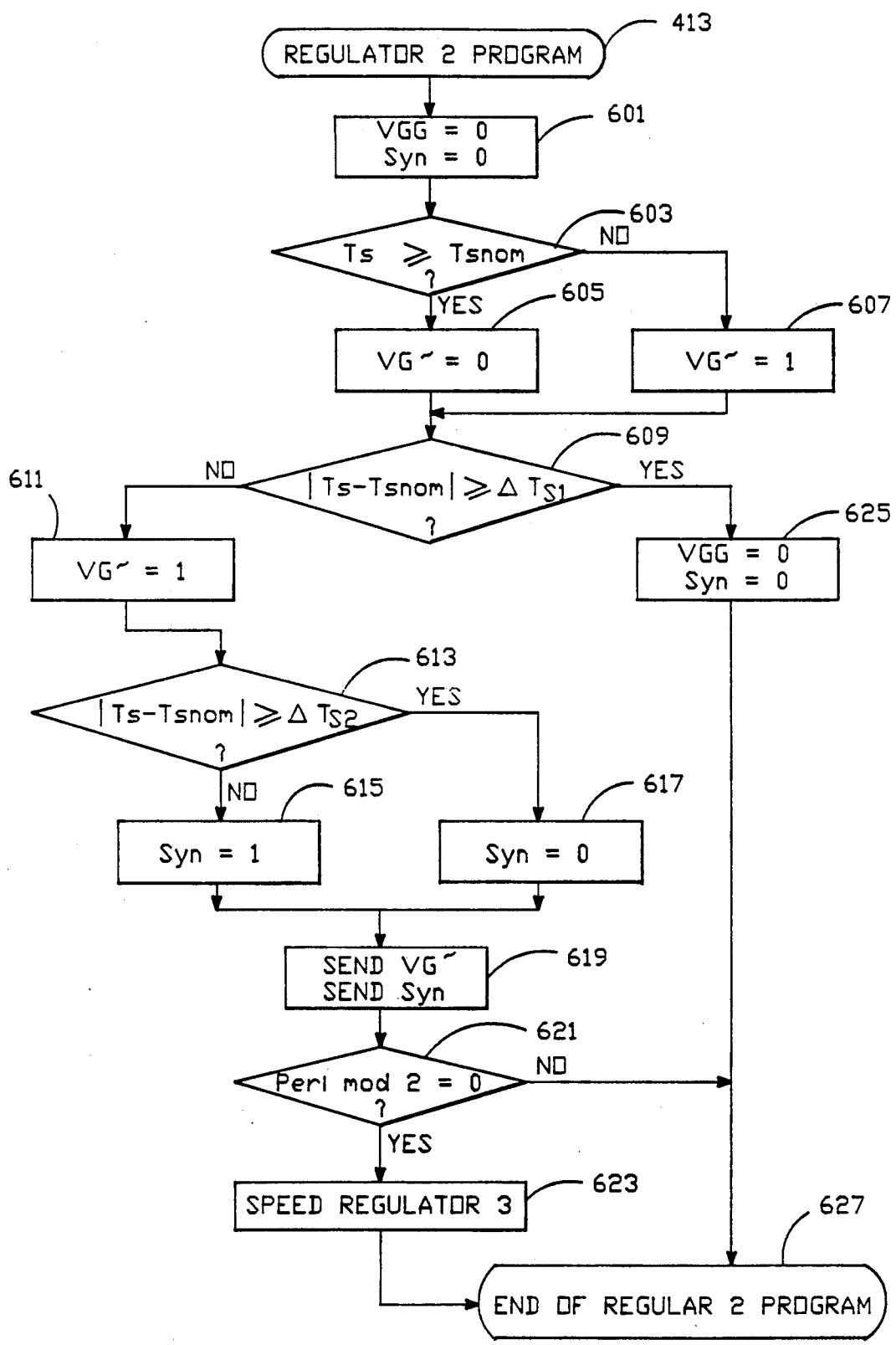

The REGULATOR 2 program of FIG. 7E sets the fine control windows ($S_{nom} \pm \neq S_1$ and $S_{nom} \pm \Delta S_2$) of FIG. 4 and maps the time $T_s$ into a control word ($V_{GG}$, $V_G^-$, SYN) for the integrator. The REGULATOR 3 subroutine is involved at step 623 if the motor moved of two poles which is determined when PER1 mod (2) equals zero.

Figure 7F:
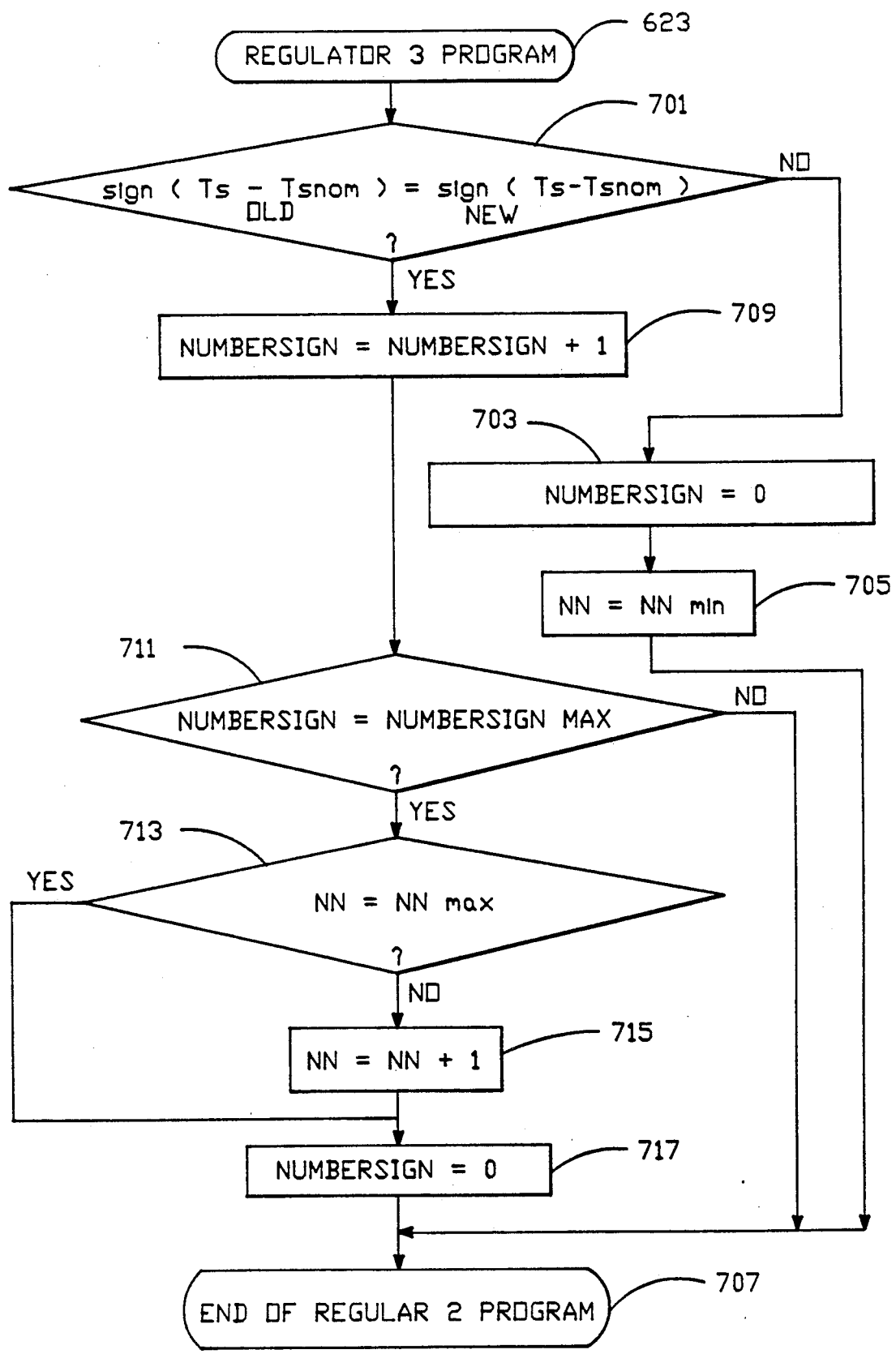

The REGULATOR 3 subroutine appears in FIG. 7F. This subroutine determines the value of NN, the duration of the speed correction pulse, necessary to accelerate/decelerate the motor. The value NN corresponds to the number of back EMF zero-crossings that the accelerating force will be applied for. In other words, it is a variable duration which is incremented if the previous duration did not sufficiently correct the motor's speed. The sufficiency is determined in step 701. If the previous sign of the difference between the measured $T_s$ and the desired $T_{snom}$ is different, step 701 result is no, from the current difference, then the current speed control application duration was sufficient. In other words, step 701 has found the motor speed to be oscillating about the nominal speed. This is the desired condition. Under this result, the duration will be set to the minimum value of NN, $NN_{min}$ in step 705.

However, if the query of step 701 results in an affirmative answer, the duration NN is incremented by one back EMF zero-crossing unless NN has attained the preset maximum value, $MN_{max}$ of step 713. (NN is not incremented if the dummy variable NUMBERSIGN has not reached the predetermined value NUMBERSIGN max.) The dummy variable, NUMBERSIGN, counts the number of times step 701 results in an affirmative answer, consecutively each time REGULATOR 3 is called. NUMBERSIGN is an image of how long (duration) the error in the speed has the same sign. Step 707 returns the speed control process to the REGULATOR 2 subroutine. The REGULATOR 2 subroutine then returns to the REGULATOR 1 subroutine at step 409 of FIG. 7C.

The REGULATOR 1 proceeds with step 415 which determines the speed corresponding to the time $T_c$ between two pole motions of the motor (time between 2-m zero crossing pulses).

At step 417, if $V_{GG}$ is 1, implying that the motor speed only requires fine tuning, then the course regulator of step 419 is not activated. If $V_{GG}$ is 0 as determined in the REGULATOR 2 subroutine, then course speed adjustment is needed and the REGULATOR 4 subroutine is invoked.

The REGULATOR 4 flow chart appears in FIG. 7G. This regulator uses the value of $T_c$ determined in step 415 of the REGULATOR 2 subroutine. A step of windows are arranged about the nominal value of $T_c$ as depicted in FIG. 4. The value of $V_G$ equaling the integrator control set of $V_G^+$, $V_G^-$, and $V_G^-$ is determined in steps 801 through 815 depending upon where within the windows the two pole motion duration has fallen. At 817, the process returns to the REGULATOR 1 subroutine.

Step 421 takes the modulo(2) of the current PER1 counter value to determine if the counter is currently an odd or even number. If PER1 is even, signifying a two pole motion completed, the PER1 counter is reset to zero. If not, the process continues with step 425.

The main program (FIG. 7A) repeats upon the occurrence of the next interrupt pulse. However, the value of NN in step 205 may be different from the initial value of $NN_{min}$ if in the processing of FIG. 7F, the speed regulation duration was not sufficient. After three interrupt pulses occur, the program returns to the REGULATOR 1 subroutine. The value of PER1 is incremented to 3 at step 401 and the queries of steps 403 and 405 are answered negatively. The procedure of step 406 is invoked.

Step 406 enquires whether the PER1 counter is an even number. If an even number is stored signifying that a two pole motion of the rotor has occurred, then the value of $T_c$ can be attained.

After 24 interrupt pulses have occurred, PER equals 3 in the main program, the REGULATOR 1 subroutine is activated. PER1 is incremented to 8, representing a full rotor revolution. Thus, the step 403 query is answered affirmatively and INDEX-SPEED MEASURE subroutine is summoned. This subroutine is depicted in FIG. 7H.

At step 901, an index pulse is created to mark the one revolution event and provide a synchronization pulse. At step 903, the counter PER1 is set to zero. And at step 905, the duration to complete one revolution from the reference point is determined and stored as $T_s$. The subroutine then returns to the REGULATOR 1 subroutine at step 411.

The value of $T_s$ is utilized in the REGULATOR 2 subroutine of step 413 in the same manner as was described when the REGULATOR 2 subroutine was invoked in step 409. The subroutine determines the value of SYN, $V_{GG}$, $V_G^-$, and NN based upon the value of $T_s$. The subroutine then returns to the REGULATOR 1 program (FIG. 7C) to make course speed corrections in steps 415, 417, and 419, if necessary. Lastly, the counters are reset and the subroutine returns to the main program (FIG. 7A) to begin the speed measurement and regulation cycle.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Apparatus for controlling the speed of a brushless DC motor, comprising:

means for detecting back EMF signals from the stator phases of said brushless DC motor;

means for controlling commutation order of said phases and current through said phases based upon signals from said back EMF detecting means;

means for current-driving said stator phases of said brushless DC motor in a specific commutation order as directed by said controlling means;

means for determining the present speed of said rotor, based upon the time required for said rotor to complete one revolution, and for determining a speed control signal based on the difference between the desired speed and said present speed if said difference is within a predetermined threshold, and based upon a fixed level otherwise;

wherein said predetermined threshold is determined by comparing the consecutive said back EMF signal from said stator phases, to indicate real speed variation of said present speed;

wherein said means for determining includes first means for measuring the time required for said rotor to make on revolution from a first arbitrary physical reference point, and a second means for measuring the time required for said rotor to make one revolution from a second physical reference point that is half of a geometrical rotor turn from said first reference point; and means for regulating total current through said phases as applied by said driving means based upon said control signal, to minimize any discrepancy between said present and said desired speed of said rotor.

2. The apparatus of claim 1, wherein said regulating means includes a variable gain integration means, having a first gain if said difference determined by said means for determining is within said predetermined threshold, and having a second gain otherwise, for for providing a shunt current drive signal, and a variable shunt current control means for regulating said total current of said current-driving means in response to said shunt current drive signal.

3. The apparatus of claim 2 wherein said variable shunt current control means further includes a divergence control circuit means for limiting said total current through said driving means using negative feedback.

4. The apparatus of claim 3 wherein said variable shunt current control means includes a power transistor.

5. The apparatus of claim 3 wherein said divergence control circuit means is a resistor and capacitor connected in series forming a negative feedback path for said variable shunt current control means.

6. The apparatus of claim 1 wherein said back EMF detecting means converts the analog back EMF signals for each phase into a digital signal that changes states at each zero crossing of said back EMF.

7. The apparatus of claim 1 wherein said back EMF detecting means converts the analog back EMF signals for each phase into a series of pulses whereby each pulse represents a zero-crossing of said back EMF signal.

8. The apparatus of claim 1 wherein said controlling means determines the current position of the rotor of said brushless DC motor and based on said current position determines the proper phase combination to be energized by said driving means and the proper timing of said energization to maintain rotor movement.

9. The apparatus of claim 1 wherein said driving means includes a plurality of transistors which are controlled by said signals from said controlling means whereby said plurality of transistors controls a plurality of power transistors that apply current to the motor phases so that the current energizes the phases at the proper time and for the proper duration to maintain rotor motion.

10. Apparatus for controlling the speed of a brushless DC motor, comprising:

means for detecting back EMF signals from the stator phases of said brushless DC motor;

means for controlling commutation order of said phases and current through said phases based upon signals from said back EMF detecting means;

means for current-driving said stator phases of said brushless DC motor in a specific commutation order as directed by said controlling means;

means for determining the present speed of said rotor, based upon the time required for said rotor to complete one revolution, and for determining a digital speed control signal based on the difference between a desired speed of said rotor and said present speed; and means for regulating the total current through said phases as applied by said driving means based upon said digital control signal, said regulating means including a variable gain integration means for converting a digital signal from said controlling means to an analog signal, and a variable shunt current control means for regulating said total current of said driving means based on said analog signal from said variable gain integration means;

wherein said variable gain integration means includes: an operational amplifier with a series connected first resistor and capacitor connected from an output of said operational amplifier to a negative input of said operational amplifier forming an integrator circuit; at least one input from said controlling means passing through at least one second resistor and having all of said second resistor outputs connected together and connected as a second input to said negative input of said operational amplifier whereby gain of said integrator is set by applying digital signals to said second resistors; and a circuit to apply a nominal voltage to a positive input terminal of said operational amplifier whereby said nominal voltage corresponds to a nominal voltage output of said integrator which determines a nominal speed of said motor when no signals are applied to said second resistors.

11. A method for controlling the speed of a brushless DC motor comprising the steps of:

detecting back EMF signals from the stator windings of said brushless DC motor;

controlling the commutation order of said windings based upon the detected said back EMF signals;

driving said stator windings of said brushless DC motor with current in a specified commutation order as determined by said step of controlling;

determining the present speed of said brushless DC motor, based upon the time requiring for said rotor to complete one revolution;

generating a speed control signal based on the difference between a desired speed of said rotor and said present speed if said difference is within a predetermined threshold, and based upon a fixed level otherwise;

wherein said predetermined threshold is determined by comparing consecutive said back EMF signals from said stator windings, to indicate real speed variations of said present speed;

providing said speed control signal to regulate the total of said current through said windings; and regulating said current through said windings to minimize any discrepancy between said present and said desired speed of said brushless DC motor.

12. The method of claim 9 wherein said step of controlling further includes determining the time required for said rotor to complete two pole motion, comparing said time to a nominal time required by said rotor to complete two pole motion at the desired speed, and providing signals to regulate said current through said windings when said measured time is greatly different than said nominal time so that said speed is adjusted in a course manner to equate said measured time with said nominal time.

13. The method of claim 9 wherein said step of regulating further includes the steps of providing the speed regulation current for a minimum period of time, determining if said period of time was sufficient to attain a speed equivalent to the desired speed, increasing said period of time for each successive speed regulation period up to a specified maximum whenever it is determined that the previous speed regulation period was not sufficient to attain the desired speed, and resetting said period of time to a minimum value after said desired speed is attained.

14. The method of claim 9 wherein said step of controlling further includes producing an index signal representing the time at which each complete revolution of said rotor has been accomplished so that peripheral circuitry can be synchronized to said revolutions.

* * * * *